UNITED STATES PATENT OFFICE

JAMES L. WRAY, OF ROCK ISLAND, ILLINOIS.

IMPROVEMENT IN COMPOUNDS FOR ARTIFICIAL STONE.

Specification forming part of Letters Patent No. 187,338, dated February 13, 1877; application filed September 30, 1876.

*To all whom it may concern:*

Be it known that I, JAMES L. WRAY, of Rock Island, in the county of Rock Island and State of Illinois, have invented certain new and useful Improvements in Compound for Artificial Stone; and I do hereby declare that the following is a full, clear, and exact description thereof, which will enable others skilled in the art to which it appertains to make and use the same.

The nature of my invention consists in a compound for artificial stone, as will be hereinafter more fully set forth.

This compound is composed silicate of soda, sulphate of potash, chloride of magnesium, and water, mixed together and charged with carbonic-acid gas.

In the preparation of this compound I take forty gallons of water and dissolve therein twenty pounds silicate of soda; two pounds sulphate of potash; three pounds chloride of magnesium. While this is being thoroughly mixed the mass is charged with all the carbonic-acid gas it will hold, and a suitable quantity of this compound is used with mortar to bring the mortar to the right consistency for use, when the artificial stone may be formed by spreading the mass to any desired thickness, or by molding it into molds of any desired shape.

I do not confine myself to the precise proportions of the ingredients herein mentioned, as they may perhaps be varied to suit circumstances.

Having thus fully described my invention what I claim as new, and desire to secure by Letters Patent, is—

The within-described compound for use in the manufacture of artificial stone, composed of silicate of soda, sulphate of potash, chloride of magnesium, and water, and charged with carbonic-acid gas, with a sufficient quantity of mortar, substantially as set forth.

In testimony that I claim the foregoing as my own, I affix my signature in presence of two witnesses.

JAMES L. WRAY.

Witnesses:
M. L. PINKLEY,
J. F. ANKRUM.